US006754711B1

(12) United States Patent
Dodrill et al.

(10) Patent No.: US 6,754,711 B1
(45) Date of Patent: Jun. 22, 2004

(54) CUSTOMER CARE CONTROL OVER VOICE APPLICATION STATE

(75) Inventors: Lewis Dean Dodrill, Richmond, VA (US); Ryan Alan Danner, Glen Allen, VA (US); William Bateford Willaford, IV, Glen Allen, VA (US)

(73) Assignee: Cisco Technology, Inc., San Jose, CA (US)

( * ) Notice: Subject to any disclaimer, the term of this patent is extended or adjusted under 35 U.S.C. 154(b) by 582 days.

(21) Appl. No.: 09/605,854

(22) Filed: Jun. 29, 2000

(51) Int. Cl.[7] ............................................... G06F 15/16
(52) U.S. Cl. ...................... 709/227; 709/223; 709/228; 709/229; 379/265.09
(58) Field of Search .......................... 709/223, 227–229; 379/265.09

(56) References Cited

U.S. PATENT DOCUMENTS

| | | | | |
|---|---|---|---|---|
| 5,838,682 A | * | 11/1998 | Dekelbaum et al. | 370/401 |
| 5,884,032 A | * | 3/1999 | Bateman et al. | 709/204 |
| 5,991,878 A | * | 11/1999 | McDonough et al. | 713/200 |
| 6,052,367 A | * | 4/2000 | Bowater et al. | 370/352 |
| 6,154,528 A | * | 11/2000 | Bennett et al. | 379/93.25 |
| 6,215,784 B1 | * | 4/2001 | Petras et al. | 370/356 |
| 6,230,287 B1 | * | 5/2001 | Pinard et al. | 714/31 |
| 6,237,033 B1 | * | 5/2001 | Doeberl et al. | 709/223 |
| 6,385,642 B1 | * | 5/2002 | Chlan et al. | 709/203 |
| 6,389,124 B1 | * | 5/2002 | Schnarel et al. | 379/142.01 |
| 6,418,199 B1 | * | 7/2002 | Perrone | 379/88.01 |
| 6,430,175 B1 | * | 8/2002 | Echols et al. | 370/352 |
| 6,490,564 B1 | * | 12/2002 | Dodrill et al. | 704/275 |
| 6,507,817 B1 | * | 1/2003 | Wolfe et al. | 704/260 |
| 6,510,439 B1 | * | 1/2003 | Rangarajan et al. | 707/201 |
| 6,578,000 B1 | * | 6/2003 | Dodrill et al. | 704/270 |
| 6,625,139 B2 | * | 9/2003 | Miloslavsky et al. | 370/352 |
| 6,654,815 B1 | * | 11/2003 | Goss et al. | 709/248 |
| 2001/0036176 A1 | * | 11/2001 | Girard | 370/352 |
| 2001/0038624 A1 | * | 11/2001 | Greenberg et al. | 370/352 |
| 2003/0033382 A1 | * | 2/2003 | Bogolea et al. | 709/218 |

OTHER PUBLICATIONS

Passmore, "Voice in an IP World," Feb. 2000, Business Commuications Review, vol. 30, Issue 2, pp. 18–20.*
Unknown Author, "Implementing a Multitier, Services–Based Architecture on the Java Platform at Sun," printed Jul. 10, 2003, from http://www.sun.com/980602/wp/Chapter_2.html, pp. 1–6.*
Jing et al., "Client–Server Computing in Mobile Environments," Jun. 1999, ACM Computing Surveys, vol. 31, Issue 2, pp. 118–157.*
Business Wire, "Synergex Announces Voice Application Servers," Jun. 21, 2000, Business Wire, New York, pp. 1ff.*

* cited by examiner

*Primary Examiner*—Krisna Lim
*Assistant Examiner*—Bradley Edelman
(74) *Attorney, Agent, or Firm*—Leon R. Turkevich (57) ABSTRACT

An application server includes an application runtime environment configured for receiving a first HTTP request having a session identifier that specifies a server-side data record configured for storing an application state for a voice application session of a first party. The application runtime environment is configured to modify the session identifier to change the application state of the voice application session of the first party based on a second HTTP request having an input posted by a second party. The application runtime environment is also configured to update a brownie of the first party to include the modified session identifier.

37 Claims, 4 Drawing Sheets

CUSTOMER CARE CONTROL OVER VOICE APPLICATION STATE

BACKGROUND OF THE INVENTION

1. Field of the Invention

The present invention relates to generating and executing voice enabled web applications within a hypertext markup language (HTML) and hypertext transport protocol (HTTP) framework.

2. Description of Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML pages, logic, and database functions. In addition, the web server may provide logging and monitoring capabilities.

In contrast to the public switched telephone network, the open standards-based IP network has enabled the proliferation of web based applications written by web application developers using ever increasing web development tools. Hence, the ever increasing popularity of web applications and web development tools provides substantial resources for application developers to develop robust web applications in a relatively short time and in an economical manner. However, one important distinction between telephony-based applications and web-based applications is that telephony-based applications are state aware, whereas web-based applications are stateless.

In particular, telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL from a client, instantiate a program configured for execution of the specific request, send an HTML web page back to the client, and terminate the program instance that executed the specific request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

Commonly-assigned, application Ser. No. 09/480,485, filed Jan. 11, 2000, entitled Application Server Configured for Dynamically Generating Web Pages for Voice Enabled Web Applications, the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Hence, web programmers can write voice-enabled web applications, using the teachings of the above-incorporated application Ser. No. 09/480,485, by writing XML pages that specify respective voice application operations to be performed. The XML documents have a distinct feature of having tags that allow a web browser (or other software) to identify information as being a specific kind or type of information. Hence, the XML documents define the application to be executed by the application server within the runtime environment, enabling voice enabled web applications to be generated and executed without the necessity of programming language environments.

A number of menu-driven telephone applications currently exist that are large and complex. From the user perspective, it is sometimes easy to get lost among the various menus. For example, in response to a prompt, the user might have pressed "1" at the main menu which results in taking the user to a sub-menu. The user might then press "6" from the sub-menu only to realize that this was not the menu selection the user wanted to select. If it is not clear how to return to the previous menu, or if so many menus have been traversed that it is difficult to retrace the steps, the user will typically hang-up and start over. One solution to this frustrating problem is to have a "0" or "*0" type menu option to contact a customer care representative. However, due to existing architectural restraints, the customer care representative has only limited control over the call, allowing things such as transferring the caller to various phone numbers with specific entry-points in the application. The customer care representative does not have control over direct menu position or the application state of the caller.

SUMMARY OF THE INVENTION

There is a need for an arrangement that enables a customer care representative to have control over direct menu position or the application state of a caller in a scalable, open standards based system on an open standards based network such as an Internet Protocol (IP) network.

These and other needs are attained by the present invention by a method, in an application server, which permits control by a second party over a voice application of a first party. The method includes receiving an HTTP request for execution of a voice application session for the first party. A state of the voice application session of the first party is prevented from being changed by the first party. Based on the HTTP request, an HTML page having a session identifier is generated for a browser of a second party for controlling the application state of the first party.

Another aspect of the present invention provides an application server having an application runtime environment configured for receiving a first HTTP request having a session identifier that specifies a server-side data record configured for storing an application state for a voice application session of a first party. The application runtime environment is configured to modify the session identifier to change the application state of the voice application session of the first party based on a second HTTP request having an input posted by a second party. The application runtime environment is also configured to update a brownie of the first party to include the modified session identifier.

Hence a second party (e.g., customer care representative) can directly modify a given field in the state information of a first party (e.g., caller) or may "drive" the application state as if he or she was the caller, so as to place the caller at the appropriate location within the application.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
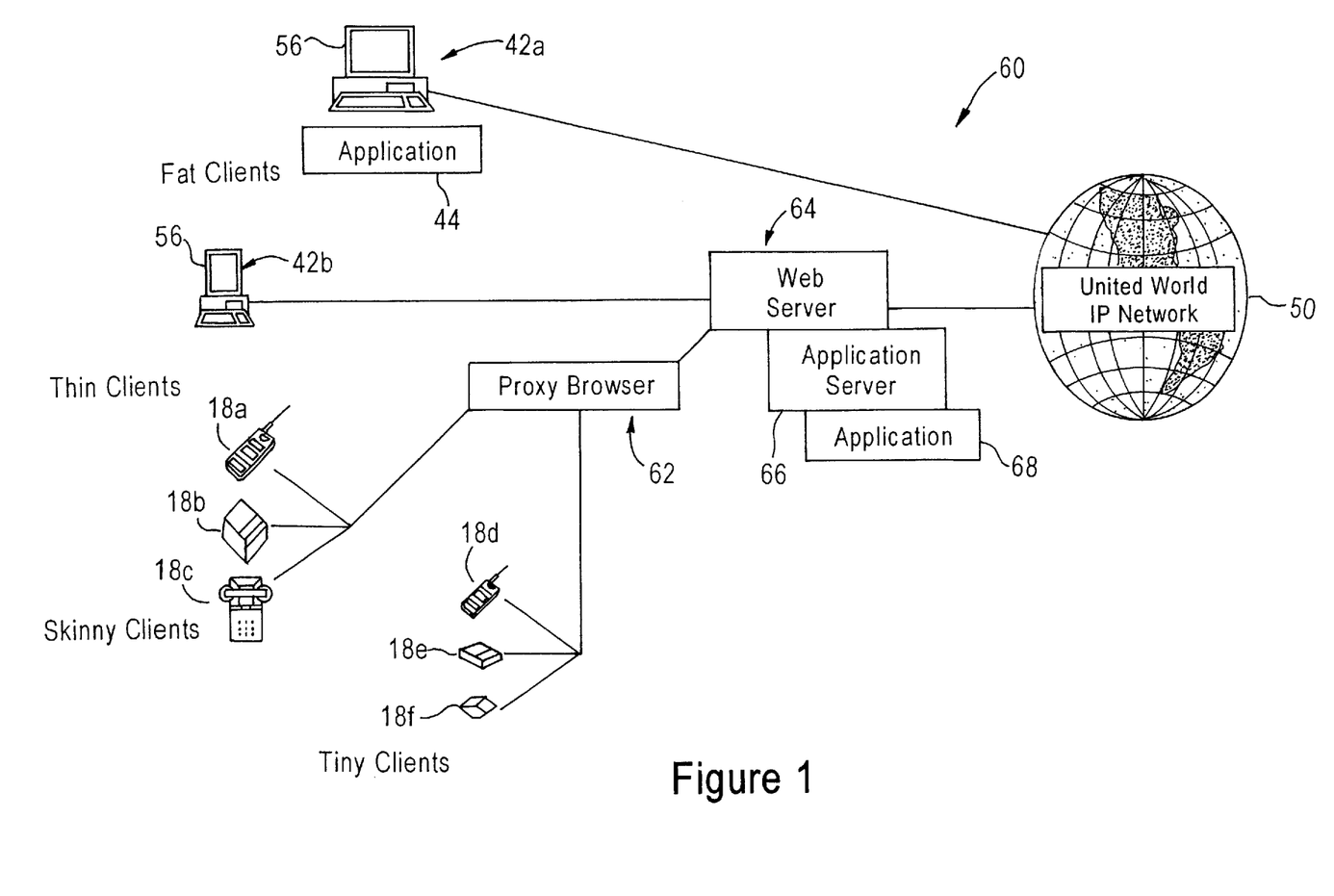
FIG. 1 is a block diagram illustrating a system enabling deployment of a customer care control over a voice application state, according to an embodiment of the present invention.

FIG. 1 is a block diagram illustrating an architecture that provides calling and data services via an IP network using browser audio control according to an embodiment of the present invention, reproduced from FIG. 3 of the above-incorporated application Ser. No. 09/480,485. The clients 42a and 42b, referred to herein as "fat clients" and "thin clients", respectively, have the distinct advantage that they can initiate requests using IP protocol to any connected web server 64 to execute part or most of the applications 44 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser; in this case, the web browser 56 can use IP protocols such as HTTP to receive and display web pages generated according to hypertext markup language (HTML) from server locations based on uniform resource locators (URLs) input by the user of the PC.

As shown in FIG. 1, each of the clients (tiny clients, skinny clients, thin clients and fat clients) are able to communicate via a single, unified architecture 60 that enables voice communications services between different clients, regardless of whether the client actually has browser capabilities. Hence, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The user devices 18a, 18b, and 18c, illustrated as a cordless telephone 18a, a fax machine 18b having an attached telephone, and an analog telephone 18c, are referred to herein as "skinny clients", defined as devices that are able to interface with a user to provide voice and/or data services (e.g., via a modem) but cannot perform any control of the associated access subnetwork.

The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, are referred to as tiny clients. "Tiny clients" are distinguishable from skinny clients in that the tiny clients tend to have even less functionality in providing input and output interaction with a user, rely exclusively,on the executable application in an access subnetwork to initiate communications; in addition, tiny clients may not be able to send or receive audio signals such as voice signals at all.

Hence, the skinny clients 18a, 18b, and 18c and the tiny clients 18d, 18e, and 18f access the calling services in the network 60 via a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18*a* and telephone 18*c* would receive analog audio signals played by the proxy browser 62 and no text information (unless a display is available); the fax machine 18*b* and pager 18*f* would only receive data/text information, and the cellular telephone 18*d* and the handheld computing device 18*e* would receive both voice and data information. Hence, the proxy browser 62 interfaces between the IP network and the respective local access devices for the skinny clients and the tiny clients to provide access to the messaging network 60.

Figure 2:
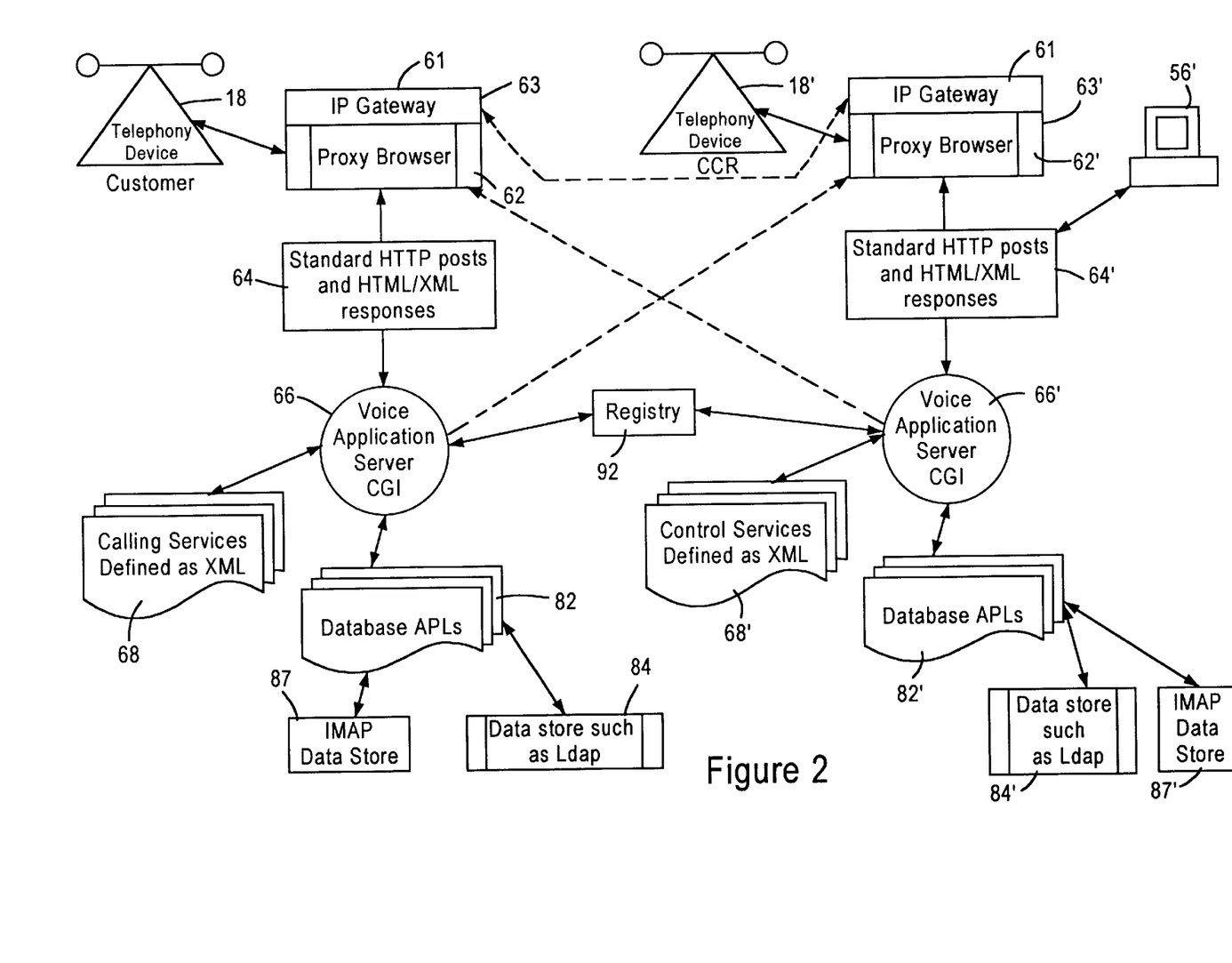
FIG. 2 is a diagram illustrating interactions of application servers of FIG. 1 with resources via an IP network for execution of customer care control according to an embodiment of the present invention.

The proxy browser 62 and the web browsers 56 within the fat client 42*a* and the thin client 42*b* execute voice enabled web applications by sending data and requests to a web server 64, and receiving hypertext markup language (HTML) web pages from the web server 64, according to hypertext transport protocol (HTTP). The web server 64 serves as an interface between the browsers and an application server 66 that provides an executable runtime environment for XML voice applications 68. For example, the web server 64 may access the application server 66 across a common gateway interface (CGI) as illustrated in FIG. 2, by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 accesses selected stored XML application pages 68 (i.e., XML pages that define an application) and in response generates new HTML pages having XML tags during runtime and supplies the generated HTML pages having XML tags to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 66 can instantiate a procedure, return the necessary data, and terminate the procedure without the necessity of maintaining the instance running throughout the entire user session.

Hence, the application server 66 executes voice application operations from a stored XML document based on a transient application state, where the application server 66 terminates the application instance after outputting the generated XML media information to the browser 62 or 42.

FIG. 2 is a diagram illustrating in further detail the calling service application for a customer executed by the voice application server 66 according to an embodiment of the present invention. As described above with respect to FIG. 1, the application server 66 receives via the web server 64 HTTP requests from either a PC-based web browser 42 capable of supporting full media content (e.g., audio, text, images, and streaming video), or as shown in FIG. 2, a proxy browser 62 configured for serving as an HTTP interface for a user input device, such as a telephone 18, having limited media capabilities (e.g., audio only). In response to receiving the HTTP requests, the voice application server 66 accesses a selected XML document 68 based on parameters specified within the HTTP request (e.g., commands specified within the URL), and based on application state determined from accessing a brownie, assuming the HTTP request specifies a valid session identifier. As described below, the application runtime environment within the voice application server 66 parses the XML tags within the accessed XML document 68, and dynamically generates an HTML page having XML tags that specify media content (e.g., .wav files) and control information for playing the media files by a proxy browser.

The voice application server 66 is configured for accessing database application programming interfaces (API's) 82 to external resources based on prescribed procedures that may be called during parsing of an XML tags in a selected XML document 68. As described below, the application server 66 issues function calls to APIs 82 for accessing the external resources for prescribed operations, enabling the deployment of a robust, scalable calling system. In particular, the application server 66 accesses subscriber profile information from an IP-based database server 84 according to LDAP protocol and can access a message store 87 according to IMAP protocol to store and retrieve messages in a standardized format.

Figure 3:
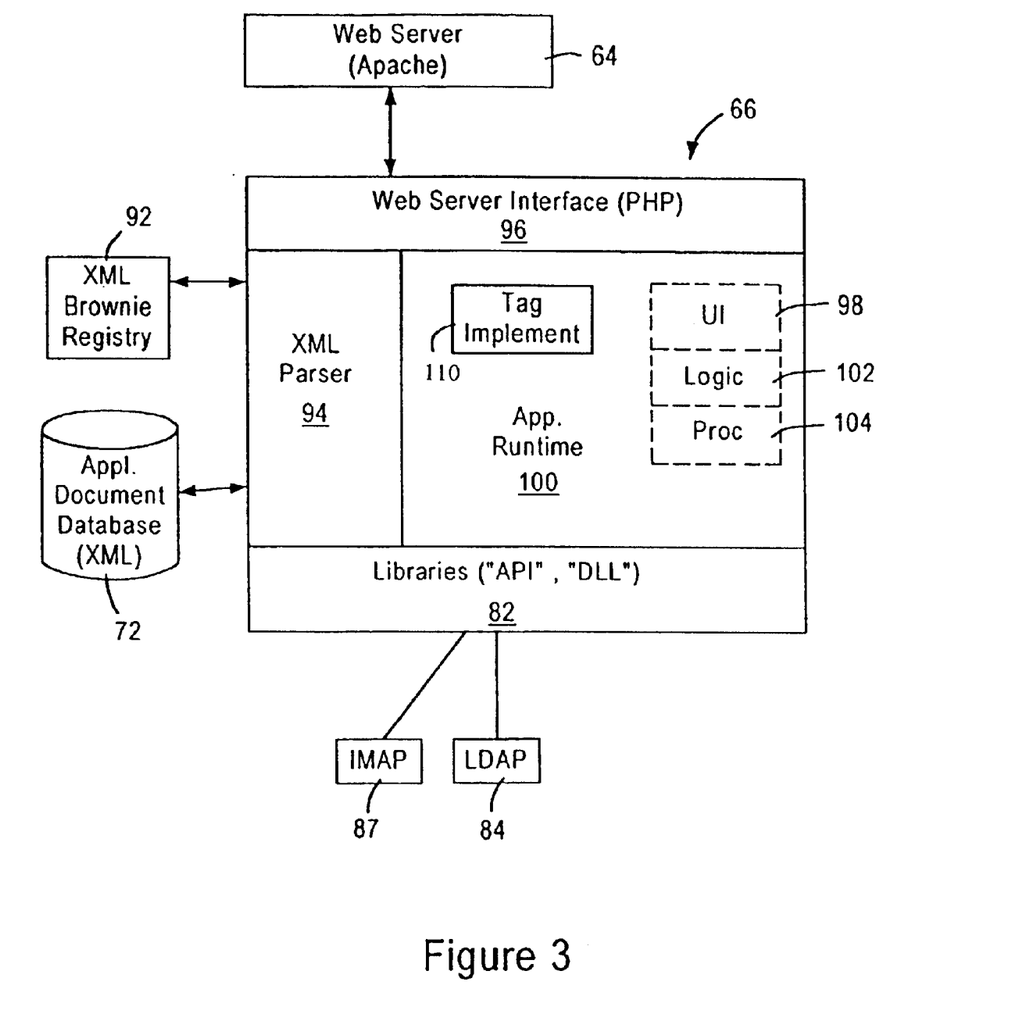
FIG. 3 is a diagram illustrating in detail an application server of FIGS. 1 and 2 according to an embodiment of the present invention.

FIG. 3 is a diagram illustrating in detail the application server 66 according to an embodiment of the present invention. The application server 66 is implemented as a server executing a PHP hypertext processor with XML parsing and processing capabilities, available open source on the Internet at http://www.php.net. As shown in FIG. 3, the server 66 includes an XML parser 94 configured for parsing the application-defining XML documents 68 stored in the XML document database 72, or the XML documents (i.e., "brownies") stored in the registry 92 and configured for specifying the state and attributes for respective user sessions. The application server 66 also includes a high speed interface 96 that establishes a high-speed connection between the application server 66 and the web server 64. For example, the PHP hypertext processor includes a high-speed interface for Apache Web servers.

The application server 66 also includes a runtime environment 100 for execution of the parsed XML documents. As described above, the runtime environment 100 may selectively execute any one of user interface operation 98, a logic operation 102, or a procedure call 104 as specified by the parsed XML document by executing a corresponding set of executable functions based on the rule set for the corresponding operation. In particular, the application runtime environment 100 includes a tag implementation module 110 that implements the XML tags parsed by the XML parser 94. The tag implementation module 110 performs relatively low-level operations, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag. Hence, the tag implementation module 110 implements the tag operations that are specified within the XML framework of the stored XML documents.

The application server 66 also includes a set of libraries 82 that may be implemented as dynamically linked libraries (DLLs) or application programming interface (API) libraries. The libraries 82 enable the runtime environment 100 to implement the procedures 104 as specified by the appropriate XML document. The application server 66 may issue a function call to one of a plurality of IP protocol compliant remote resources 84 or 87. For example, the PHP hypertext processor includes executable routines capable of accessing the LDAP data store 84 or an IMAP data store 87. The data store 84 can include user information for calling services such as the identities and telephone numbers of persons that the user wishes to communicate with. The IMAP data store 87 is used to store messages. Note that the mechanisms for accessing the services 84 and 87 should be established within the application server before use of XML documents that reference those services. Once the services 84 and 87 are established, the application runtime environment 100 can perform a function operation by using executable functions specified by a function call rule set.

An arrangement for executing a voice application and permitting one party to control the voice application of another party will now be described. With reference to FIG. 2, a voice application server 66' permits a customer care representative (CCR) to control a voice application from a customer via web server 64', proxy browser 62', telephone 18'. It can be appreciated that instead of using a proxy browser and telephone, the CCR may employ a personal computer having a web browser to communicate with the application server 66'. APIs 82, data store 84' and message store 87', and XML documents 68' are accessed by the voice application server 66' in a manner similar to application server 66 serving the customer.

Figure 4:
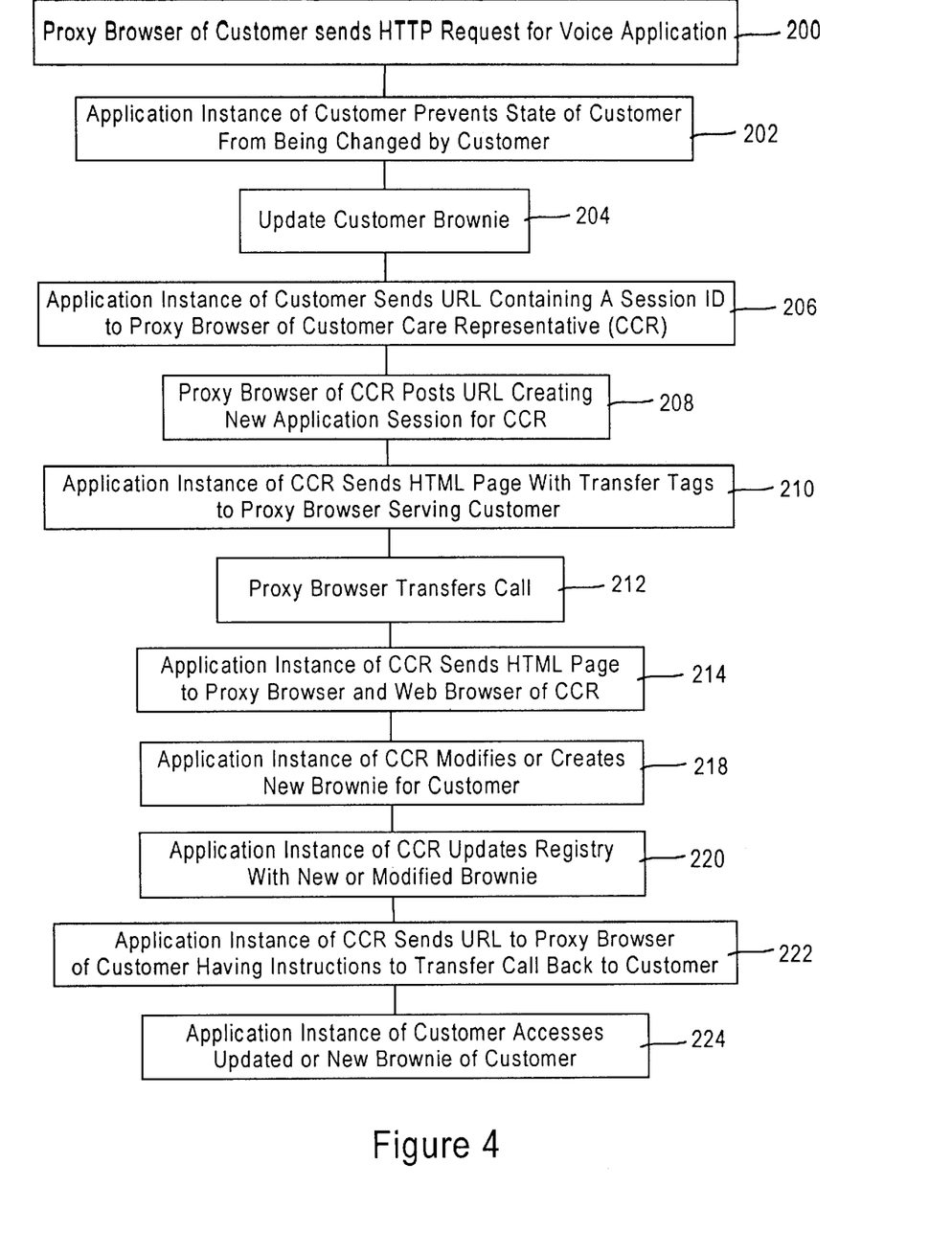
FIG. 4 is a diagram illustrating the execution of customer care control over a voice application state of a customer according to an embodiment of the present invention.

FIG. 4 illustrates a customer calling a customer care line and the CCR controlling the voice application of the customer according to an embodiment of the present invention. The steps described in FIG. 4 can be implemented as executable code stored on a computer readable medium (e.g., a hard disk drive, a floppy drive, a random access memory, a read only memory, an EPROM, a compact disc, etc.).

With reference to FIG. 4, when the customer is interacting with the application instance 66, for example, during a telephone call to a customer care line, the customer may become lost in the various menus presented. At this time, the customer may wish to speak with a customer care representative. Thus, the application instance 66 receives in step 200 an HTTP request from the proxy browser 62 enabling a customer to speak with a CCR. This can occur, for example, if the customer inputs "0" while in the menu options. In step 202, the application instance 66 serving the customer prevents the state of the voice application session of the customer to change, for example, by ignoring a DTMF signal inputted by the customer when the customer selects a further menu option after inputting "0" or "*0". The application instance 66 of the customer updates the customer's brownie, including the session identifier and telephony identifier, in registry 92 in step 204 and in step 206, sends a URL containing a session identifier that specifies a new server-side data record configured for storing a new application state for a voice application for the CCR on behalf of the customer to the proxy browser 62' serving the CCR. The new data record (brownie) for the CCR includes the session identifier of the old customer brownie. The proxy browser 62' posts the URL in step 208 thereby creating a new application session for the CCR at application instance 66'. In step 240, an HTML page with transfer tags is sent to the proxy browser 62 serving the customer. The proxy browser 62 transfers the call (e.g., creates a bridge) to the IP gateway 61' of the proxy device 63' serving the CCR in step 212. In step 216, the application instance 66' sends an HTML page having control services defined as XML documents to the proxy browser 62' and to web browser 56'. The customer can now speak with the CCR, and based on instructions from the customer, the CCR can instruct the application server 66' in step 218 to modify (or create a new session identifier for) the customer brownie to modify or change the state of the voice application session for the customer. In step 220, using, for example, an HTML form sent from the web browser 56', the application instance 66' updates the registry 92 to include the modified or new session identifier for the brownie of the customer. The application instance 66' also sends a URL to the proxy browser 62 of the customer in step 222 having instructions to "transfer" the call back to the application instance 66. Thus, upon receiving the URL posted by the proxy browser 62, the application instance 66 accesses the updated or new brownie initiating the new state of voice application session for the customer in step 224.

Hence, the CCR can drive the application state of the customer or may modify given field in the state information to direct the customer to another customer service menu, enhancing the quality of the customer's interaction with the CCR.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an application server for controlling a voice application of another party, the method comprising:

receiving a first HTTP request having a session identifier that specifies a server-side data record configured for storing an application state for a voice application session of a first party;

modifying the session identifier to change the application state of the voice application session of the first party based on a second HTTP request having an input posted by a second party; and updating a brownie of the first party to include the modified session identifier.

2. The method of claim 1, wherein the brownie is stored in a registry and the step of updating the brownie includes accessing the registry.

3. The method of claim 1, further including generating an HTML page having transfer tags for instructing a proxy browser device serving the first party to transfer a call at the proxy browser device of the first party to a proxy browser device serving the second party.

4. The method of claim 3, wherein after the updating step, the method further includes generating an HTML page having instructions for the proxy browser device serving the first party to transfer the call back to the proxy browser device of the first party.

5. The method of claim 1, wherein the step of modifying the session identifier includes generating a HTML page having XML tags having instructions for controlling the application state of the first party.

6. A method in an application server for controlling a voice application of another party, the method comprising:

receiving a first HTTP request having a session identifier that specifies a server-side data record configured for storing an application state for a voice application session of a first party;

creating a new session identifier to create a new application state of the voice application session of the first party based on a second HTTP request having an input posted by a second party; and updating a brownie of the first party to include the new session identifier.

7. The method of claim 6, wherein the brownie is stored in a registry and the step of updating the brownie includes accessing the registry.

8. The method of claim 6, further including generating an HTML page having transfer tags for instructing a proxy browser device serving the first party to transfer a call at the proxy browser device of the first party to a proxy browser device serving the second party.

9. The method of claim 8, wherein after the updating step, the method further includes generating an HTML page having instructions for the proxy browser device serving the first party to transfer the call back to the proxy browser device of the first party.

10. The method of claim 6, wherein the step of modifying the session identifier includes generating a HTML page having XML tags having instructions for controlling the application state of the first party.

11. A method in an application server for permitting control by a second party over a voice application of a first party, the method comprising:
   receiving an HTTP request for execution of a voice application session for the first party;
   preventing a state of the voice application session of the first party from being changed by the first party; and
   based on the HTTP request, generating, for a browser of a second party, an HTML page having a session identifier.

12. The method of claim 11, wherein the preventing step includes ignoring, in the application session of the first party, DTMF signals inputted by the first party.

13. The method of claim 11, wherein the step of generating the HTML page includes generating a URL containing the session identifier.

14. An application server configured for executing a calling application, the application server including:
   an application runtime environment configured for dynamically generating, in response to a HTTP request, a hypertext markup language (HTML) document having instructions for preventing a state of the voice application session of the first party from being changed by the first party, the application runtime environment being configured for generating, based on the HTTP request, an HTML page having a session identifier for a browser of a second party.

15. The application server of claim 14, wherein the application runtime environment is configured to ignore DTMF signals inputted by the first party.

16. The application server of claim 14, wherein the application runtime environment is configured to generate a URL containing the session identifier.

17. An application server configured for executing a calling application, the application server including:
   an application runtime environment configured for receiving a first HTTP request having a session identifier that specifies a server-side data record configured for storing an application state for a voice application session of a first party, the application runtime environment being configured to modify the session identifier to change the application state of the voice application session of the first party based on a second HTTP request having an input posted by a second party and the application runtime environment being configured to update a brownie of the first party to include the modified session identifier.

18. The application server of claim 17, wherein the brownie is stored in a registry and the application runtime environment is configured to access the registry.

19. The application server of claim 17, wherein the application runtime environment is configured to generate an HTML page having transfer tags for instructing a proxy browser device serving the first party to transfer a call at the proxy browser device of the first party to a proxy browser device serving the second party.

20. The application server of claim 19, wherein the application runtime environment is configured to generating an HTML page having instructions for the proxy browser device serving the first party to transfer the call back to the proxy browser device of the first party.

21. An application server configured for executing a calling application, the application server including:
   an application runtime environment configured for receiving a first HTTP request having a session identifier that specifies a server-side data record configured for storing an application state for a voice application session of a first party, the application runtime environment being configured to create a new session identifier to create a new application state of the voice application session of the first party based on a second HTTP request having an input posted by a second party and the application runtime environment being configured to update a brownie of the first party to include the new session identifier.

22. The application server of claim 21, wherein the brownie is stored in a registry and the application runtime environment is configured to access the registry.

23. The application server of claim 21, wherein the application runtime environment is configured to generate an HTML page having transfer tags for instructing a proxy browser device serving the first party to transfer a call at the proxy browser device of the first party to a proxy browser device serving the second party.

24. The application server of claim 23, wherein the application runtime environment is configured to generating an HTML page having instructions for the proxy browser device serving the first party to transfer the call back to the proxy browser device of the first party.

25. A computer readable medium having stored thereon sequences of instructions for executing a voice application, the sequences of instructions including instructions for performing the steps of:
   receiving a first HTTP request having a session identifier that specifies a server-side data record configured for storing an application state for a voice application session of a first party;
   creating a new session identifier to create a new application state of the voice application session of the first party based on a second HTTP request having an input posted by a second party; and
   updating a brownie of the first party to include the new session identifier.

26. The medium of claim 25, further including generating an HTML page having transfer tags for instructing a proxy browser device serving the first party to transfer a call at the proxy browser device of the first party to a proxy browser device serving the second party.

27. The medium of claim 25, wherein after the updating step, the method further includes generating an HTML page having instructions for the proxy browser device serving the first party to transfer the call back to the proxy browser device of the first party.

28. A computer readable medium having stored thereon sequences of instructions for changing a state of a voice application of another, the sequences of instructions including instructions for performing the steps of:

receiving an HTTP request for execution of a voice application session for a first party;

preventing a state of the voice application session of the first party from being changed by the first party; and based on the HTTP request, generating, for a browser of a second party, an HTML page having a session identifier.

29. The medium of claim 28, wherein the preventing step includes ignoring, in the application session of the first party, DTMF signals inputted by the first party.

30. The medium of claim 28, wherein the step of generating the HTML page includes generating a URL containing the session identifier.

31. An application server configured for executing a calling application, the application server including:

means for dynamically generating, in response to a HTTP request, a hypertext markup language (HTML) document having instructions for preventing a state of a voice application session of a first party from being changed by the first party, the generating means being configured for generating, based on the HTTP request, an HTML page having a session identifier for a browser of a second party.

32. The application server of claim 31, wherein the generating means is configured to ignore DTMF signals inputted by the first party.

33. The application server of claim 31, wherein the generating means is configured to generate a URL containing the session identifier.

34. An application server configured for executing a calling application, the application server including:

means for receiving a first HTTP request having a session identifier that specifies a server-side data record configured for storing an application state for a voice application session of a first party, the receiving means being configured to modify the session identifier to change the application state of the voice application session of the first party based on a second HTTP request having an input posted by a second party, and the receiving means being configured to update a brownie of the first party to include the modified session identifier.

35. The application server of claim 34, wherein the brownie is stored in a registry and the receiving means is configured to access the registry.

36. The application server of claim 34, wherein the receiving means is configured to generate an HTML page having transfer tags for instructing a proxy browser device serving the first party to transfer a call at the proxy browser device of the first party to a proxy browser device serving the second party.

37. The application server of claim 36, wherein the receiving means is configured to generating an HTML page having instructions for the proxy browser device serving the first party to transfer the call back to the proxy browser device of the first party.

* * * * *